United States Patent
Stefani et al.

(10) Patent No.: US 8,985,930 B2
(45) Date of Patent: Mar. 24, 2015

(54) PLANT FOR STORING PRODUCTS

(75) Inventors: Franco Stefani, Sassuolo (IT); Stefano Cassani, Imola (IT); Federico Calzini, Urbino (IT)

(73) Assignee: System Logistics S.p.A., Fiorano Modenese (IT)

( * ) Notice: Subject to any disclaimer, the term of this patent is extended or adjusted under 35 U.S.C. 154(b) by 144 days.

(21) Appl. No.: 13/576,324

(22) PCT Filed: Feb. 28, 2011

(86) PCT No.: PCT/IB2011/050845
§ 371 (c)(1),
(2), (4) Date: Jul. 31, 2012

(87) PCT Pub. No.: WO2011/107926
PCT Pub. Date: Sep. 9, 2011

(65) Prior Publication Data
US 2012/0328396 A1 Dec. 27, 2012

(30) Foreign Application Priority Data

Mar. 1, 2010 (IT) .............................. MO2010A0047

(51) Int. Cl.
*B65G 1/00* (2006.01)
*B65G 1/02* (2006.01)
*B65G 1/04* (2006.01)

(52) U.S. Cl.
CPC ... *B65G 1/02* (2013.01); *B65G 1/04* (2013.01)
USPC ........................................................ 414/277

(58) Field of Classification Search
CPC .. B65G 1/0435; B65G 1/0407; B65G 49/085; B66F 9/07; G11B 17/225; G11B 15/6835
USPC .................................................. 414/277, 280
See application file for complete search history.

(56) References Cited

U.S. PATENT DOCUMENTS

| | | | | | |
|---|---|---|---|---|---|
| 3,393,814 | A | * | 7/1968 | Atwater | 414/282 |
| 3,450,276 | A | * | 6/1969 | Ferrari | 414/276 |
| 3,485,389 | A | * | 12/1969 | Armington et al. | 414/282 |
| 3,792,758 | A | * | 2/1974 | Wentz | 187/236 |
| 3,827,365 | A | | 8/1974 | Coppel | |

(Continued)

FOREIGN PATENT DOCUMENTS

| | | |
|---|---|---|
| DE | 203 05 148 U1 | 4/2004 |
| DE | 10 2005 048 379 A1 | 4/2007 |

(Continued)

*Primary Examiner* — Saul Rodriguez
*Assistant Examiner* — Emery Hassan
(74) *Attorney, Agent, or Firm* — Pearne & Gordon LLP

(57) ABSTRACT

A plant for storing products including at least a pair of vertical stores (40) facing one another, each being provided with opposite flanks (4) which are provided with pluralities of guides (6) located such that a pair of opposite guides which face one another on the same horizontal plane define end rests for single drawers or trays (5). Housings for the drawers or trays are defined between the pairs of guides and the contiguous pairs of guides, each of which is transferable between a load/unload configuration of the products and a storage configuration in which the drawer or tray is inserted with ends thereof on a pair of opposite guides and vice versa. An elevator (9) is provided, mobile along a development direction (A) of the vertical stores such as to move the drawers or trays. The opposite flanks of the stores are provided with profiled uprights (4a).

7 Claims, 5 Drawing Sheets

(56) References Cited

U.S. PATENT DOCUMENTS

| | | | |
|---|---|---|---|
| 3,840,131 A * | 10/1974 | Castaldi | 414/281 |
| 5,104,277 A * | 4/1992 | Bullock | 414/280 |
| 5,199,840 A | 4/1993 | Castaldi et al. | |
| 5,203,661 A * | 4/1993 | Tanita et al. | 414/331.16 |
| 5,791,852 A | 8/1998 | Bibby et al. | |
| 5,833,427 A | 11/1998 | Siegler et al. | |
| 6,113,336 A * | 9/2000 | Chang et al. | 414/281 |
| 2004/0234364 A1 | 11/2004 | Ehrenleitner et al. | |
| 2005/0002762 A1* | 1/2005 | Gambarelli et al. | 414/280 |
| 2005/0095095 A1* | 5/2005 | Hansl | 414/280 |
| 2008/0279669 A1 | 11/2008 | Hanel | |

FOREIGN PATENT DOCUMENTS

| | | |
|---|---|---|
| EP | 0 599 032 A1 | 6/1994 |
| EP | 0 734 974 A1 | 3/1996 |
| EP | 1 462 391 A1 | 3/2004 |
| EP | 1 449 795 A1 | 8/2004 |
| FR | 2 137 081 A1 | 12/1972 |
| JP | 08290809 A | 11/1996 |
| JP | 09104508 A | 4/1997 |
| WO | 86/03246 A1 | 6/1986 |
| WO | 92/02438 A1 | 2/1992 |

\* cited by examiner

PLANT FOR STORING PRODUCTS

TECHNICAL FIELD

The invention relates to a plant for storing products. The plant is applicable as an automatic store, for example in the industrial field or the large distribution sector.

BACKGROUND ART

Plants are known for storing products and in particular automatic stores, comprising, essentially, a frame which defines pairs of flanks that face one another.

Each flank is essentially constituted by a frame having several shelves which comprises a plurality of horizontal guides. Each pair of reciprocally-facing flanks is able to define a plurality of housings for drawers or trays.

The drawers or trays can be inserted or extracted from the housings such as to allow storing and/or removing of the products contained or resting on the drawers or trays.

For storing products to be stored, the drawer or tray is switchable, i.e. positionable at least between a load/unload configuration and a storing configuration. In the load/unload configuration the drawer or tray is located at a predetermined load height such as to be accessible to an operator.

In the storing configuration the drawer or tray is inserted in a housing between two flanks.

Normally insertion of a single drawer or tray is done using the mentioned horizontal guides which enable the drawer or tray to be drawn (in the case of extraction) by an elevator which is inserted between the two pairs of uprights and which can be moved on command at least in a vertical direction and can be precisely faced to the desired housing such as to enable movement of the drawers or trays for either insertion or extraction thereof.

The elevator also has the function of moving the drawer or tray between the load/unload configuration and the storing configuration, and vice versa.

The elevator is provided with means that have the function of moving it along a vertical direction, between the two pairs of uprights.

In more detail, the elevator comprises a support for the drawers or trays arranged along a horizontal development direction. Each upright exhibits a side that is adjacent to the elevator, and a further side that is opposite the elevator.

The elevator further comprises a movement device for the drawers or trays, which inserts and extracts the drawers or trays to and from the guides located on the uprights.

During normal operation, the products to be stored are loaded on the drawer or tray, which is raised from the loading position up to a predetermined storage height corresponding to the preselected housing in which the single drawer or tray is to be inserted.

Thereafter, the drawer or tray passes into the storage configuration and is inserted into the chosen housing.

The operation of inserting the drawer or tray in the housing is reversible, such as to enable extraction thereof. In particular, the drawer or tray is transported by the elevator from the storage configuration to the unloading configuration, such as to be newly accessible to the operator.

EP 0734974 shows a system having stacks of load carriers. A vertically movable removable/insertion device has a lifting mechanism, to move a load carrier resting on a lower one, into a position at a distance above it. Independent of the raised carrier, the lower load carriers are then moved by the device horizontally to the removal/insertion point, or are moved from this point onto the device. Each stack is formed by only two load carriers. The supports for the load carriers are formed by rails, which are suspended in holes in the side walls of the shelves.

Known-type plants for storing products exhibit important disadvantages. The uprights tend to deform due to the weight or the load stored in the housings. Other causes of deformation can be attributed to problems connected with the functioning of the plant such as, for example, wrong load/unload manoeuvres which cause the single drawer or tray to assume an incorrect position which causes interference with stress forces applied on the flanks and the relative uprights. Also, the presence of loads of non-standard shapes can cause faulty positioning of the elevator, which might is cause a drawer to invade the sliding zone of the elevator such as to cause a violent collision there-with, with a final result that is, as in the preceding cases, a bellying-out of the flanks. These situations can set in act a dangerous "domino effect", causing other drawers to fall as they lose their rests.

In all the above cases, the relative position of the corresponding guides on the opposite flanks, destined to receive and support the single trays, can change by effect of the deformations induced by the load, and thus not maintain the alignment necessary for the correct insertion of further drawers or trays. The effect can be further exacerbated by the manufacturing and mounting tolerances of the structure.

This dealignment is proportional to the amount the uprights and the flanks are distanced and can even produce, in the absence of appropriate stiffening tie-rods, the above-described "bellying-out" between the flanks and, in particular, between the uprights on the insertion and de-insertion side of the drawers and trays. This would be extremely dangerous exactly because some of the drawers or trays in the store might lose their rest support. To obviate this risk, normally horizontal tie-rods are inserted, which however have the drawback of subtracting useful space in a vertical direction to the "window" of insertion/de-insertion of the drawers or trays (with a consequent need to have unusable spaces internally of the store).

In this context, the technical task underpinning the present invention is to provide a plant for storing products which obviates the drawbacks of the to prior art as cited above.

In particular, an aim of the present invention is to make available a plant or automatic store for storing products, in which the zone facing the elevator is free of connecting beams to the flanks.

The set technical task and aims are substantially attained by a plant for storing products, comprising the technical characteristics set out in one or more of the appended claims.

DISCLOSURE OF THE INVENTION

Further characteristics and advantages of the present invention will more clearly emerge in the following non-limiting description of some preferred but not exclusive embodiments of a plant or automatic store for storing products, as illustrated in the accompanying drawings, in which.

Figure 1:
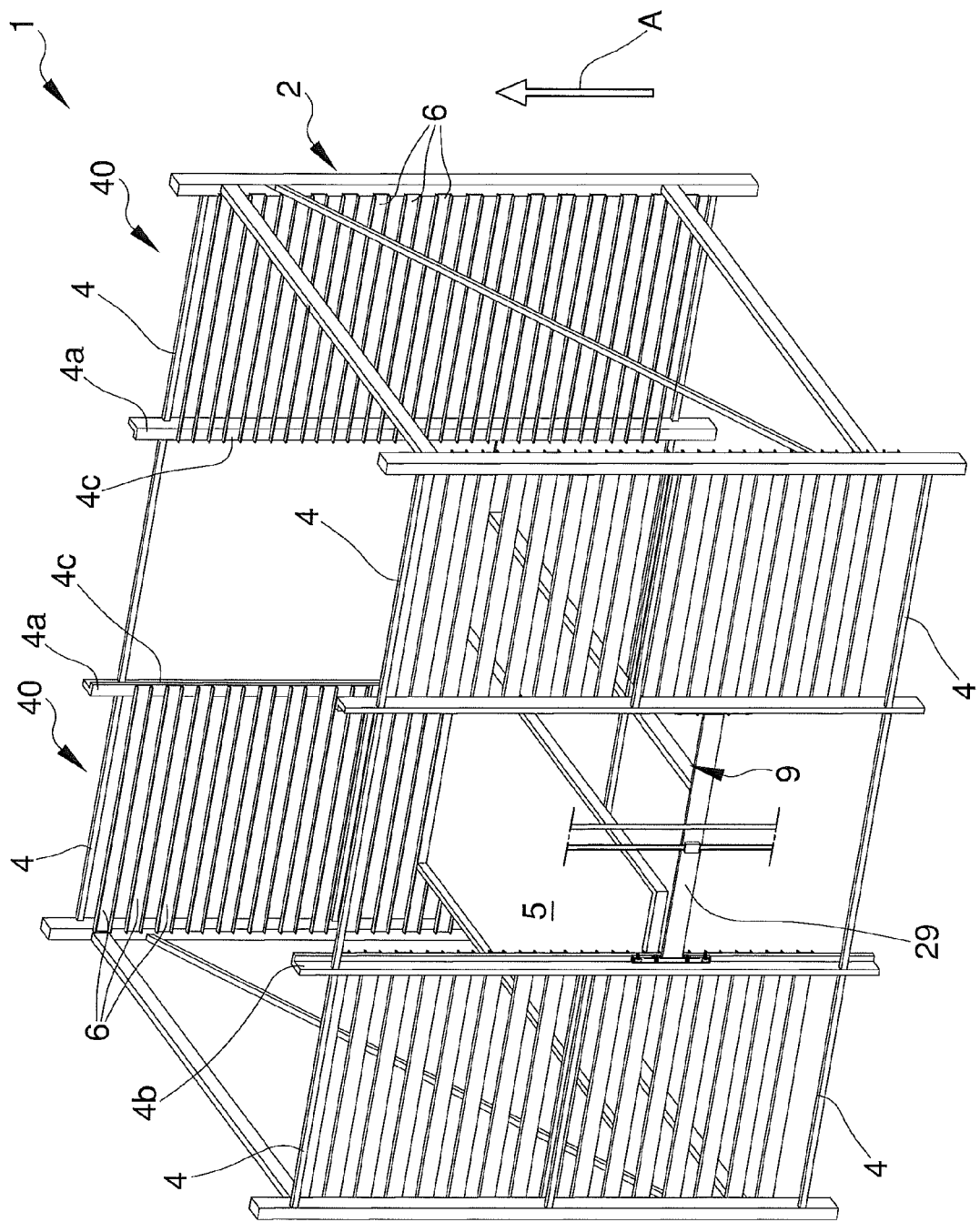
FIG. 1 is a perspective view of a plant for storing products according to the present invention.
Figure 2:
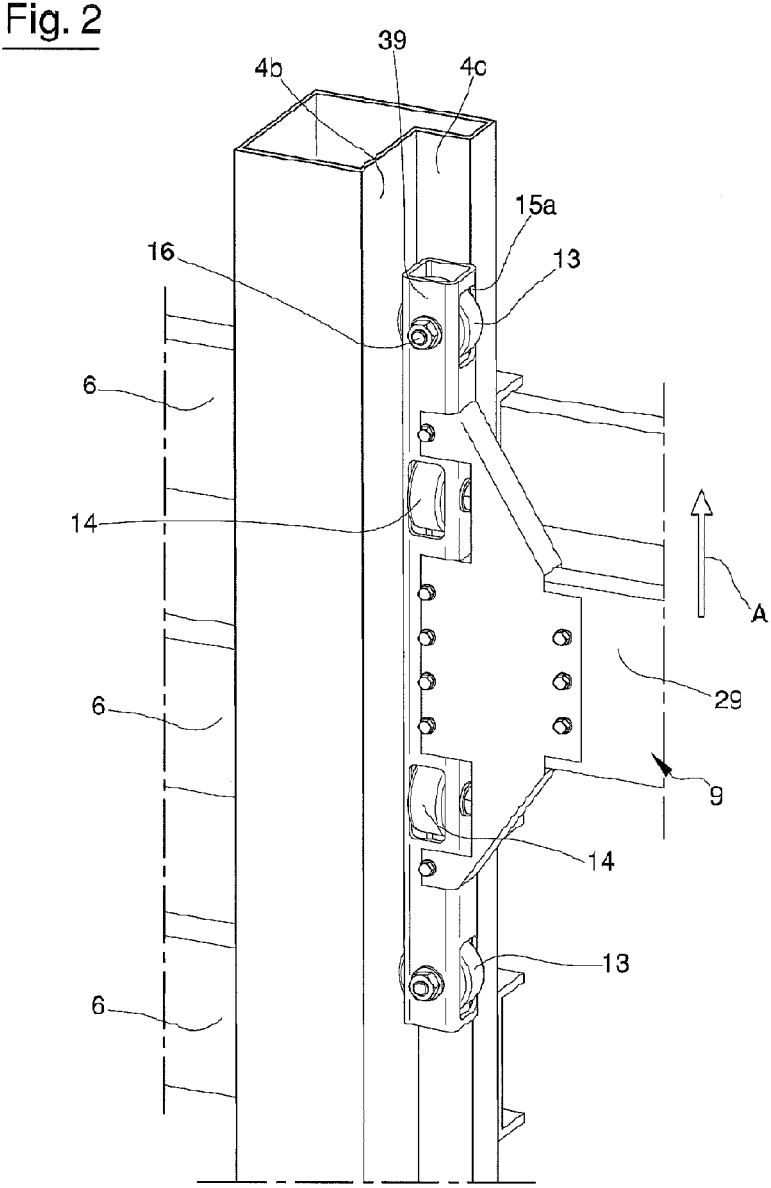
FIG. 2 is a perspective view of a detail of the plant for storing products of FIG. 1.
Figure 3:
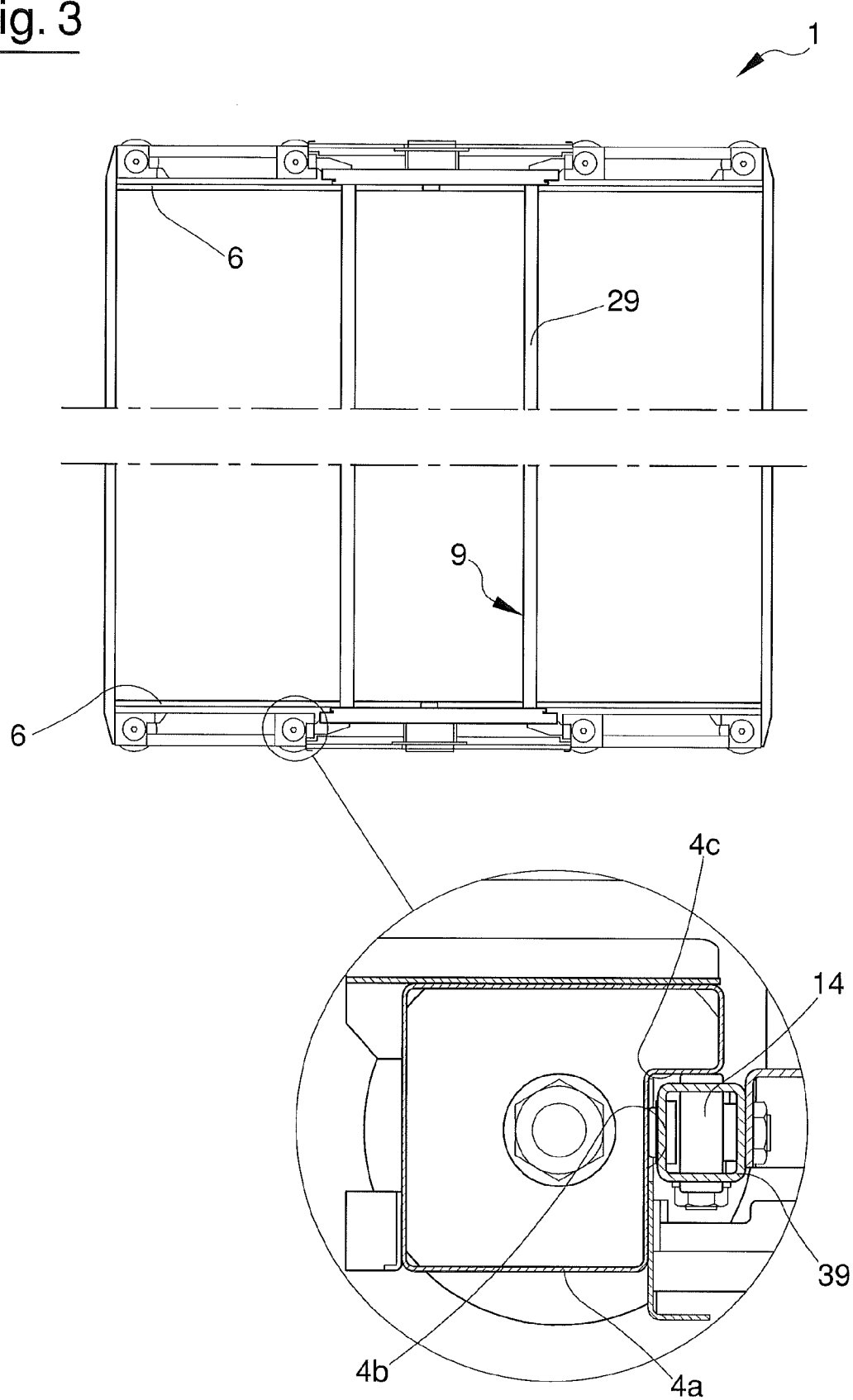
FIG. 3 shows a portion of a schematic plan view from above of the plant, partly sectioned according to a horizontal plane.

With reference to the mentioned figures, 1 denotes in its entirety a plant for storing products in which a frame 2 comprises a pair of vertical stores 40 symmetrically facing one another at a predetermined distance.

Each store 40 is provided with opposite flanks 4 which are provided with pluralities of guides 6 located such that pairs of guides 6 that are opposite and reciprocally facing on the same horizontal plane define the end rests to for single drawers or trays 5.

Between each pair of opposite and reciprocally facing guides 6 on a same horizontal plane and the contiguous pairs (above or below), spaces are defined, constituting housings for the drawers or trays 5. Each drawer or tray 5 is of such dimensions as to be housable in a housing and is in particular transferable between a load/unload configuration of the products, at which it is accessible from externally of the stores 40 (more precisely, at a predetermined height in space comprised between the stores 40) and a storing configuration in which the drawer or tray 5 is inserted internally of said housing, with ends thereof solidly resting on a pair of said opposite guides 6, and vice versa.

The movement of the single drawers or trays 5 is realised by means of an elevator 9, associated to the frame 2, which is mobile along a development direction of the vertical stores 40 in order to move the single drawer or tray 5 in said vertical direction and to laterally translate the drawers or trays 5 between the above-described load/unload and storing configurations. The elevator 9 is provided with means, of known type and not illustrated in the figures, by means of which the single drawer or tray 5 is translated on command horizontally such as to be introduced and/or extracted into and out of the store 40 where it rests with its ends on the guides 6 which are opposite and reciprocally facing on the same horizontal plane in the store.

In place of two stores 40 reciprocally facing onto the zone in which the elevator 9 operates, it is possible to provide a realisation in which only one store 40 served by an elevator is present.

In the embodiment illustrated in the accompanying drawings, the stores 40 are provided with opposite flanks 4 which are structurally provided with profiled uprights 4a situated on the side facing towards the central zone occupied by the elevator 9.

The uprights 4a not only support the ends of the guides 6 but are also conformed such as to be associated to the ends of the frame of the elevator 9 such as to realise a sliding coupling in a parallel direction to the profiled uprights 4a themselves.

The conformation of the section of the uprights, which are straight, and the type of connection realised between them and the ends of the elevator 9 are specially predisposed, according to the invention, for maintaining the two profiled uprights 4a and the relative opposite flanks 4 of each store 40 at a predetermined distance at least at the coupling zone with the elevator, or rather with the frame 29 of the elevator.

The uprights 4a of each store 40 are symmetrically arranged with respect to a vertical median plane parallel to the guides 6 and exhibit rolling surfaces 4b, 4c on which first and second wheels 13 and 14 arranged at the ends of the frame 29 of the elevator 9 slidably couple.

At least the surfaces 4c on which the second wheels 14 are slidably coupled are substantially parallel to the direction of introduction/extraction of the drawers or trays 5, which is parallel to the guides 6.

More precisely, a pair of first wheels 13 and a pair of second wheels 14 are located at the coupling of each end of the frame 29 of the elevator 9 with each upright 4a.

With reference to each upright 4a, the first wheels 13 of the relative pair are located symmetrically with respect to a median horizontal plane of the frame 29.

In the same way, with reference to each upright 4a the second wheels 14 of the relative pair are located symmetrically with respect to a horizontal median plane of the frame 29.

Still with reference to each upright 4a, the second wheels 14 and the first wheels 13 are freely hinged to an element 39 having a tubular profile which is fixed to the frame 29 and is vertically arranged.

The tubular element 39 is for the aim provided with passage holes through which the first and second wheels 13 and 14 project at least partially such as to be able to freely roll on the respective surfaces 4b and 4c.

The coupling described, with the surfaces 4c of the profiled profiles 4a of each store 40 symmetrically opposite one another, enables, via the second wheels 14, realisation at least in the zone in which the elevator 9 is present, an effective contrast action against local distancing of the profiled uprights 4a. In other words, it enables the uprights of each relative store 40 to be maintained parallel and equidistant. The elevator structure 9, i.e. the frame 29, functions as a mobile transversal connection between the opposite flanks 4 of the whole structure. This gives an obvious advantage with respect to the prior art, as it avoids recourse to fixed connecting elements.

Note that while on the one hand the solution proposed by the invention prevents the distance between the two opposite uprights 4a from increasing, providing the structure with the required stiffness, the opposite danger, i.e. the reduction in the distance, is obstructed by the presence of the store 40 of the drawers or trays 5.

Figure 4:
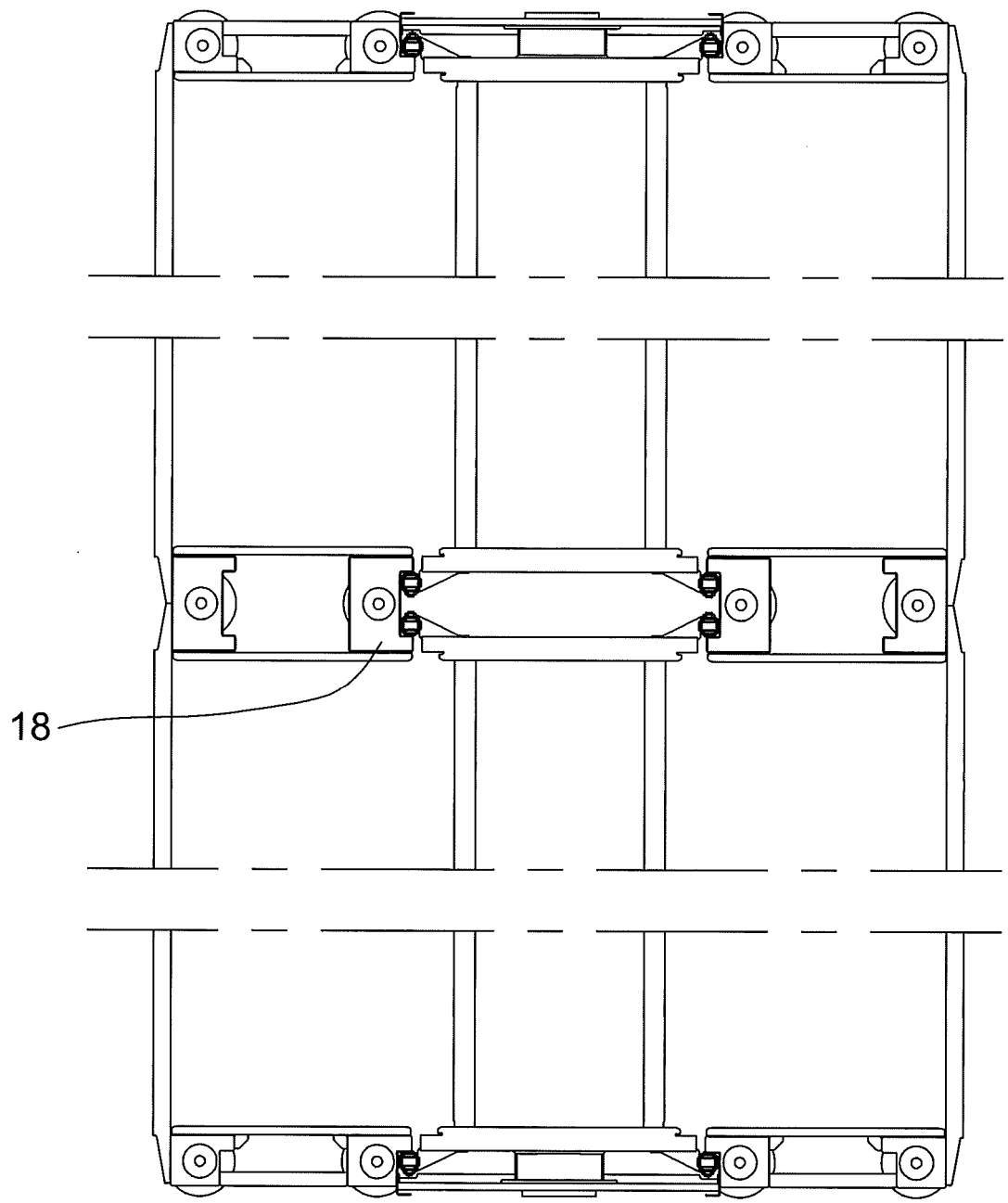
FIG. 4 illustrates several aligned stores with two contiguous stores 40 joined and coupled by means of a single upright.

In a further embodiment, illustrated in FIG. 4, solutions can be provided in which there is a predisposing of a larger number of aligned stores 40 such that two contiguous stores 40 are grouped and coupled by means of a single upright 18.

Figure 5:
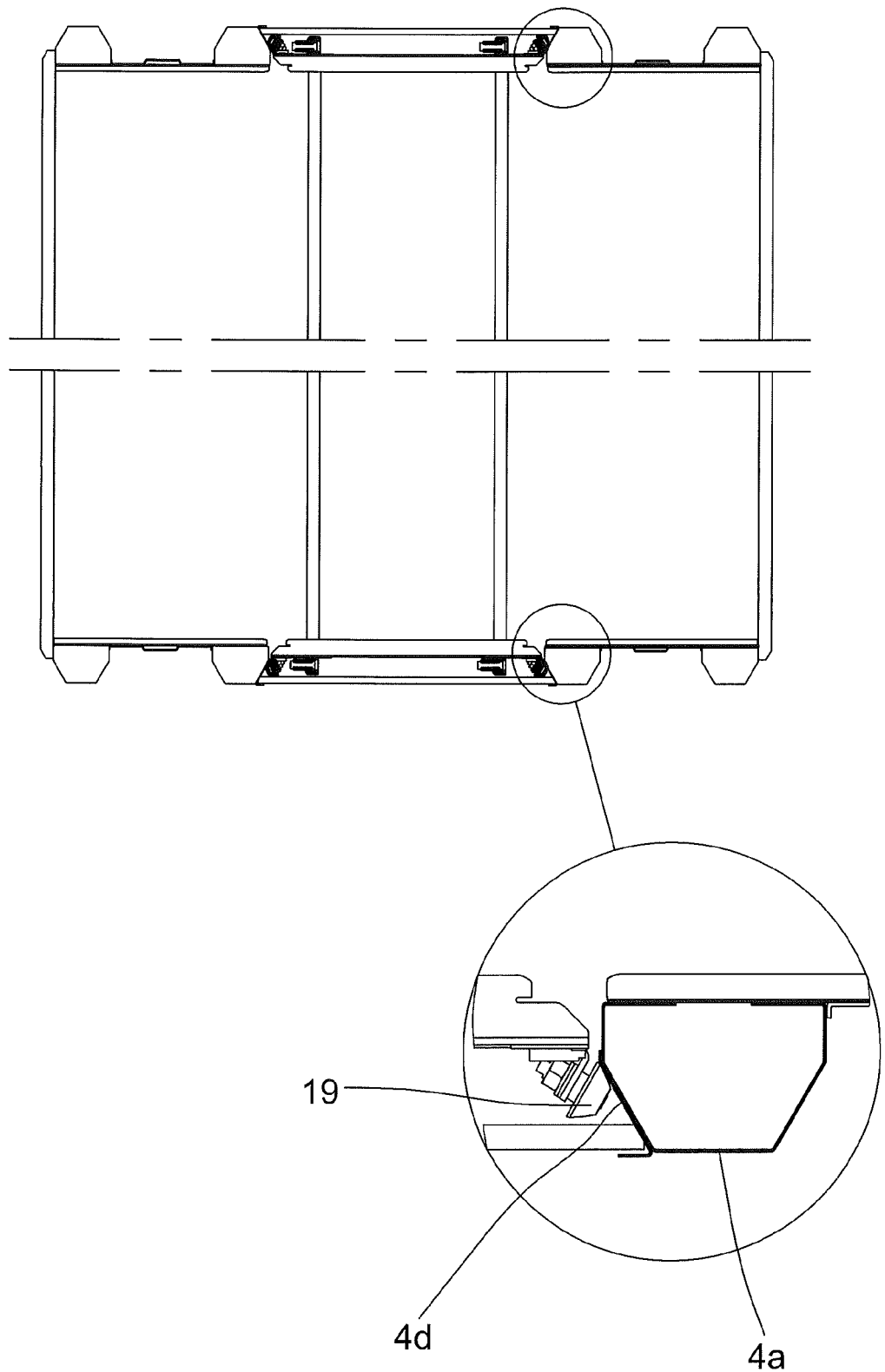
FIG. 5 illustrates an embodiment in which each upright 4a comprises a single surface 4d that is inclined with respect to the introduction/extraction direction of the drawers or trays.

A further possibility is to provide an embodiment as in FIG. 5, in which each upright 4a comprises, in place of the two surfaces 4b and 4c, arranged perpendicularly to one another, a single surface 4d, inclined with respect to the direction of introduction/extraction of the drawers or trays 5. In this way a single set of wheels 19 is able to perform the functions of the first and second wheels 13 and 14 contemporaneously.

The invention claimed is:

1. A plant for storing products, comprising: a frame (2) which defines at least a vertical store (40) having opposite flanks (4) that have pluralities of guides (6) located in such a way that a pair of opposite and reciprocally-facing guides (6) on a same horizontal plane define end rests for a single drawer or tray (5); housings being defined between the pairs of guides (6) and pairs of guides (6) opposite thereof for the drawers or trays (5); each drawer or tray (5) being transferable between a product load/unload configuration and a product storing configuration in which the drawer or tray (5) is inserted with ends thereof on said pair of opposite guides (6); an elevator (9) being coupled to the frame (2) and mobile along a development direction (A) of the vertical stores (40) in order to move the drawer or tray (5) between the configurations, characterized in that the opposite flanks (4) of the at least a store (40) have profiled uprights (4a), situated on a side facing towards the zone occupied by the elevator (9), which profiled uprights (4a) are conformed to be associated to the ends of a frame of the elevator (9) such as to realise a sliding coupling in a parallel direction to the profiled uprights (4a) destined to maintain the two profiled uprights (4a) and the opposite relative flanks (4) of the at least a store (40) at a predetermined distance; the frame (2) comprising at least a pair of vertical stores (40) which reciprocally face one another, the opposite flanks (4) of each store (40) having the profiled uprights (4a), situated on a side facing towards the central zone occupied by the elevator (9), which are conformed such as to be associated to the ends of the frame of the elevator (9) such as to realise a sliding coupling in a parallel direction to the profiled uprights (4a) which parallel direction is destined to maintain the two profiled uprights (4a) and the opposite relative flanks (4) of the at least a store (40) at a predetermined distance; the uprights (4a) of each store (40) are symmetrically arranged and exhibit rolling surfaces (4b, 4c) on which first and second wheels (13 and 14) slidably couple, which wheels (13, 14) are arranged at ends of the frame (29) of the elevator (9); at least the surfaces (4c) on which the second wheels (14) are slidably coupled being substantially parallel to the introduction/extraction direction of the drawers or trays (5) which direction is parallel to the guides (6); the surfaces (4c) of the profiled uprights (4a) of each store (40) being symmetrically opposite one another; the conformation of the section of the uprights, which are straight, and the type of connection realised between them and the ends of the elevator (9) are specially predisposed, for maintaining the two profiled uprights (4a) and the relative opposite flanks (4) of each store (40) at a predetermined distance at least at the coupling zone with the frame (29) of the elevator or with the elevator;

wherein the two profiled uprights (4a) of each store (40) include a respective longitudinal rolling surface (4c, 4d) facing outside the plant (1); and each end of the frame (29) of the elevator (9) being slidingly coupled via wheels (14, 19) with a profiled upright (4a) of each store (40) at respective rolling surface (4c, 4d) thereof, so as to define a mobile transversal connection between the opposite flanks (4) of the whole structure, whereby preventing the distance between opposite uprights (4a) from increasing.

2. The plant of claim 1, characterised in that a pair of the first wheels (13) and a pair of the second wheels (14) are provided at the coupling of each end of the frame (29) of the elevator (9) with each upright (4a).

3. The plant of claim 2, characterised in that with reference to each upright (4a), the two first wheels (13) of the relative couple are located symmetrically with respect to a median horizontal plane of the frame (29).

4. The plant of claim 3, characterised in that, with reference to each upright (4a) the two second wheels (14) of the relative pair are symmetrically located with respect to a median horizontal plane of the frame (29).

5. The plant of claim 4, characterised in that with reference to each upright (4a), the second wheels (14) and the first wheels (13) are freely pivoted to a tubular element (39) fixed to the frame (29) of the elevator (9); the tubular element being provided with passage holes through which the first wheels (13) and the second wheels (14) project at least partly such as to be able to freely roll on the respective rolling surfaces (4b, 4c).

6. The plant of claim 1, characterised in that the uprights (4a) of each store (40) are symmetrically arranged and exhibit rolling surfaces (4d) on which third wheels (19) arranged at the ends of the frame (29) of the elevator (9) slidingly couple; the surfaces (4d) on which the third wheels (19) are sliding coupled being inclined with respect to the direction of introduction/extraction of the drawers or trays (5) which direction is parallel to the guides (6).

7. A plant for storing products, comprising: a frame (2) which defines at least a vertical store (40) having opposite flanks (4) that have pluralities of guides (6) located in such a way that a pair of opposite and reciprocally-facing guides (6) on a same horizontal plane define end rests for a single drawer or tray (5); housings being defined between the pairs of guides (6) and pairs of guides (6) opposite thereof for the drawers or trays (5); each drawer or tray (5) being transferable between a product load/unload configuration and a product storing configuration in which the drawer or tray (5) is inserted with ends thereof on said pair of opposite guides (6); an elevator (9) being coupled to the frame (2) and mobile along a development direction (A) of the vertical stores (40) in order to move the drawer or tray (5) between the configurations, characterized in that the opposite flanks (4) of the at least a store (40) have profiled uprights (4a), situated on a side facing towards the zone occupied by the elevator (9), which profiled uprights (4a) are conformed to be associated to the ends of a frame of the elevator (9) such as to realise a sliding coupling in a parallel direction to the profiled uprights (4a) destined to maintain the two profiled uprights (4a) and the opposite relative flanks (4) of the at least a store (40) at a predetermined distance; the frame (2) comprising at least a pair of vertical stores (40) which reciprocally face one another, the opposite flanks (4) of each store (40) having the profiled uprights (4a), situated on a side facing towards the central zone occupied by the elevator (9), which are conformed such as to be associated to the ends of the frame of the elevator (9) such as to realise a sliding coupling in a parallel direction to the profiled uprights (4a) which parallel direction is destined to maintain the two profiled uprights (4a) and the opposite relative flanks (4) of the at least a store (40) at a predetermined distance; the uprights (4a) of each store (40) are symmetrically arranged and exhibit rolling surfaces (4b, 4c) on which first and second wheels (13 and 14) slidably couple, which wheels (13, 14) are arranged at ends of the frame (29) of the elevator (9); at least the surfaces (4c) on which the second wheels (14) are slidably coupled being substantially parallel to the introduction/extraction direction of the drawers or trays (5) which direction is parallel to the guides (6); wherein the two profiled uprights (4a) of each store (40) include a respective longitudinal rolling surface (4c, 4d) facing outside the plant (1); and each end of the frame (29) of the elevator (9) being slidingly coupled via wheels (14, 19) with a profiled upright (4a) of each store (40) at respective rolling surface (4c, 4d) thereof, so as to define a mobile transversal connection between the opposite flanks (4) of the whole structure, whereby preventing the distance between opposite uprights (4a) from increasing.

* * * * *